US012603824B2

(12) United States Patent     (10) Patent No.:   US 12,603,824 B2

Vaishnavi et al.     (45) Date of Patent:    Apr. 14, 2026

(54) NETWORK SLICE INSTALLATION-BASED DEPLOYMENT TESTING

(71) Applicant: Lenovo (Singapore) Pte. Ltd., New Tech Park (SG)

(72) Inventors: Ishan Vaishnavi, Munich (DE); Genadi Velev, Darmstadt (DE); Dimitrios Karampatsis, Ruislip (GB)

(73) Assignee: Lenovo (Singapore) Pte. Ltd., Singapore (SG)

( * ) Notice: Subject to any disclaimer, the term of this patent is extended or adjusted under 35 U.S.C. 154(b) by 172 days.

(21) Appl. No.: 18/293,254

(22) PCT Filed: Jul. 28, 2022

(86) PCT No.: PCT/IB2022/057018

§ 371 (c)(1),
(2) Date: Jan. 29, 2024

(87) PCT Pub. No.: WO2023/007438

PCT Pub. Date: Feb. 2, 2023

(65) Prior Publication Data

US 2025/0097136 A1     Mar. 20, 2025

Related U.S. Application Data

(60) Provisional application No. 63/226,387, filed on Jul. 28, 2021.

(51) Int. Cl.
H04L 43/20       (2022.01)
G06F 8/65        (2018.01)
(Continued)

(52) U.S. Cl.
CPC ................ H04L 43/20 (2022.05); G06F 8/65 (2013.01); H04W 36/30 (2013.01); H04W 48/18 (2013.01)

(58) Field of Classification Search
CPC ...... H04L 43/20; H04W 36/30; H04W 48/18; G06F 8/65
(Continued)

(56) References Cited

U.S. PATENT DOCUMENTS 10,833,938 B1 *   11/2020   Rajput .................... H04L 67/30
11,310,733 B1 *   4/2022   Gupta ............... H04W 28/0268
(Continued)

FOREIGN PATENT DOCUMENTS

WO       2021119627 A1     6/2021

OTHER PUBLICATIONS

PCT/IB2022/057018, "Notification of Transmittal of the International Search Report and the Written Opinion of the International Searching Authority, or the Declaration", International Searching Authority, Nov. 18, 2022, pp. 1-16.
(Continued)

*Primary Examiner* — Wing F Chan
*Assistant Examiner* — Leon Y Tseng
(74) *Attorney, Agent, or Firm* — Kunzler Needham & Hilton

(57) ABSTRACT

Apparatuses, methods, and systems are disclosed for network slice installation-based deployment testing. An apparatus (300) includes a transceiver (325) and a processor (305) coupled to the transceiver (325). The processor (305) is configured to cause the apparatus (300) to detect that a new version of network software is available, determine an incorporation plan for migrating to the new version of the network software, request a new network slice instance for deploying the new version of the network software according to the determined incorporation plan, and monitor performance of the one or UE devices using the new version of the network software in the new network slice instance.

15 Claims, 6 Drawing Sheets

(51) Int. Cl.
    *H04W 36/30*     (2009.01)
    *H04W 48/18*     (2009.01)
(58) Field of Classification Search
    USPC ........................................................ 709/224
    See application file for complete search history.

(56)              References Cited

U.S. PATENT DOCUMENTS

| | | |
|---|---|---|
| 2020/0053083 A1 | 2/2020 | Kunz et al. |
| 2020/0177457 A1 | 6/2020 | Seenappa et al. |
| 2021/0153044 A1 | 5/2021 | Ramanathan et al. |

OTHER PUBLICATIONS

Ericsson, "Network Functions Virtualization and Software Management", Ericsson White Paper, Dec. 2014, pp. 1-10.

3GPP, "3rd Generation Partnership Project; Technical Specification Group Services and System Aspects; Management and Orchestration; Study on continuous integration continuous delivery support for 3GPP NFs (Release 17)", 3GPP TR 28.819 V0.1.0, May 2021, pp. 1-14.

3GPP, "3rd Generation Partnership Project; Technical Specification Group Services and System Aspects; System architecture for the 5G System (5GS); Stage 2 (Release 17)", 3GPP TS 23.501 V17.1.0, Jun. 2021, pp. 1-526.

3GPP, "3rd Generation Partnership Project; Technical Specification Group Services and System Aspects; Management and orchestration; Provisioning; (Release 17)", 3GPP TS 28.531 V17.0.0, Jun. 2021, pp. 1-73.

3GPP, "3rd Generation Partnership Project; Technical Specification Group Services and System Aspects; Management and orchestration; 5G Network Resource Model (NRM); Stage 1 (Release 17)", 3GPP TS 28.540 V17.1.0, Jun. 2021, pp. 1-10.

* cited by examiner

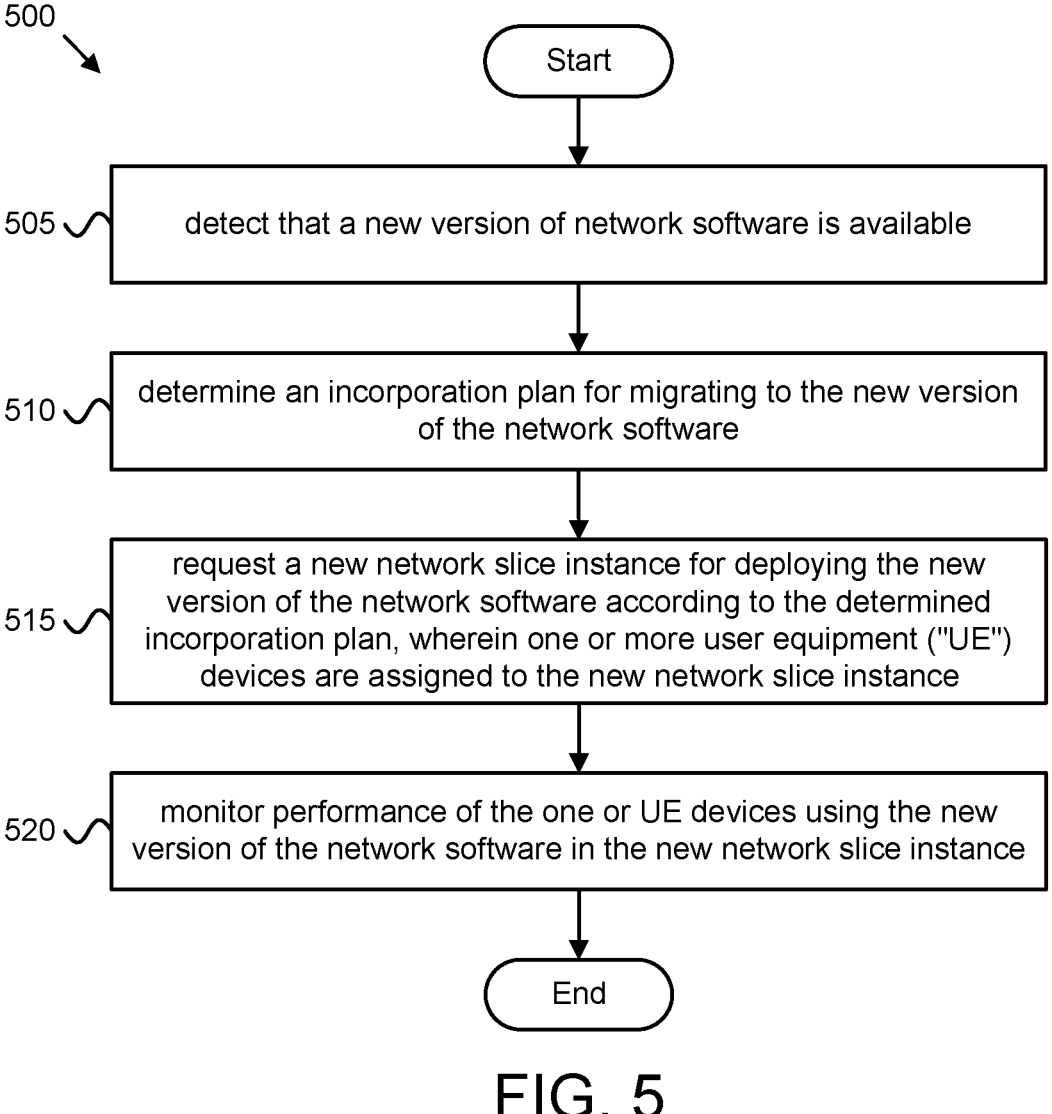

500

Start

505 — detect that a new version of network software is available

510 — determine an incorporation plan for migrating to the new version of the network software 515 — request a new network slice instance for deploying the new version of the network software according to the determined incorporation plan, wherein one or more user equipment ("UE") devices are assigned to the new network slice instance 520 — monitor performance of the one or UE devices using the new version of the network software in the new network slice instance End

FIG. 5

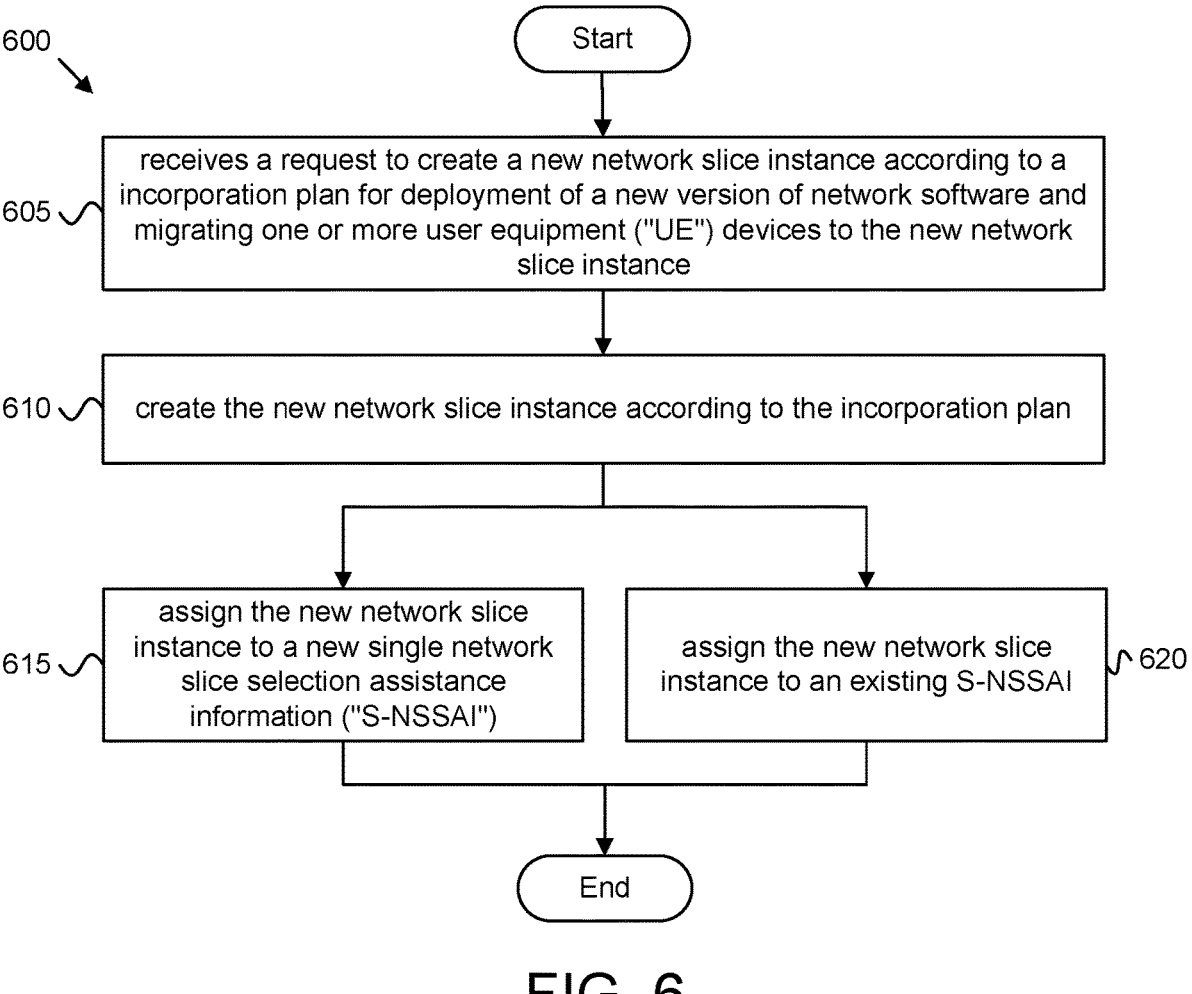

600

Start

605 — receives a request to create a new network slice instance according to a incorporation plan for deployment of a new version of network software and migrating one or more user equipment ("UE") devices to the new network slice instance 610 — create the new network slice instance according to the incorporation plan 615 — assign the new network slice instance to a new single network slice selection assistance information ("S-NSSAI")

620 — assign the new network slice instance to an existing S-NSSAI

End

FIG. 6

NETWORK SLICE INSTALLATION-BASED DEPLOYMENT TESTING

CROSS REFERENCE TO RELATED APPLICATIONS

This application claims the benefit of U.S. Provisional Patent Application No. 63/226,387, entitled "METHOD AND APPARATUS FOR NETWORK SLICE INSTALLA-TION-BASED DEPLOYMENT TESTING FOR NEW SOFTWARE" and filed on Jul. 28, 2021, for Ishan Vaishnavi et al., which is incorporated herein by reference.

FIELD

The subject matter disclosed herein relates generally to wireless communications and more particularly relates to network slice installation-based deployment testing.

BACKGROUND

Telecom networks involve various software components. The 5G architecture, particularly in management and control plane, is increasingly made up of virtualized software entities that can regularly be updated. Once a new version of the software is delivered by a vendor, the operator my perform some initial testing until the software exists in the deployment repository. However, not all day-to-day situations can be captured by testing, and newer software may still be prone to unforeseen issues.

BRIEF SUMMARY

Disclosed are solutions for network slice installation-based deployment testing. The solutions may be implemented by apparatus, systems, methods, or computer program products.

In one embodiment, a first apparatus includes a transceiver and a processor coupled to the transceiver. In one embodiment, the processor is configured to cause the apparatus to detect that a new version of network software is available. In one embodiment, the processor is configured to cause the apparatus to determine an incorporation plan for migrating to the new version of the network software. In one embodiment, the processor is configured to cause the apparatus to request a new network slice instance for deploying the new version of the network software according to the determined incorporation plan, wherein one or more UE devices are assigned to the new network slice instance. In one embodiment, the processor is configured to cause the apparatus to monitor performance of the one or UE devices using the new version of the network software in the new network slice instance.

In one embodiment, a first method detects that a new version of network software is available. In one embodiment, the first method determines an incorporation plan for migrating to the new version of the network software. In one embodiment, the first method requests a new network slice instance for deploying the new version of the network software according to the determined incorporation plan, wherein one or more UE devices are assigned to the new network slice instance. In one embodiment, the first method monitors performance of the one or UE devices using the new version of the network software in the new network slice instance.

In one embodiment, a second apparatus includes a transceiver and a processor coupled to the transceiver. In one embodiment, the processor is configured to cause the apparatus to receive a request to create a new network slice instance according to an incorporation plan for deployment of a new version of network software and migrating one or more UE devices to the new network slice instance. In one embodiment, the processor is configured to cause the apparatus to create the new network slice instance according to the incorporation plan. In one embodiment, the processor is configured to cause the apparatus to assign the new network slice instance to a new Single Network Slice Selection Assistance Information ("S-NSSAI") or assign the new network slice instance to an existing S-NSSAI.

In one embodiment, a second method receives a request to create a new network slice instance according to an incorporation plan for deployment of a new version of network software and migrating one or more UE devices to the new network slice instance. In one embodiment, the second method creates the new network slice instance according to the incorporation plan. In one embodiment, the second method assigns the new network slice instance to a new S-NSSAI or assign the new network slice instance to an existing S-NSSAI.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a flowchart diagram illustrating one embodiment of a method for network slice installation-based deployment testing; and FIG. 6 is a flowchart diagram illustrating one embodiment of another method for network slice installation-based deployment testing.

DETAILED DESCRIPTION

Figure 1:
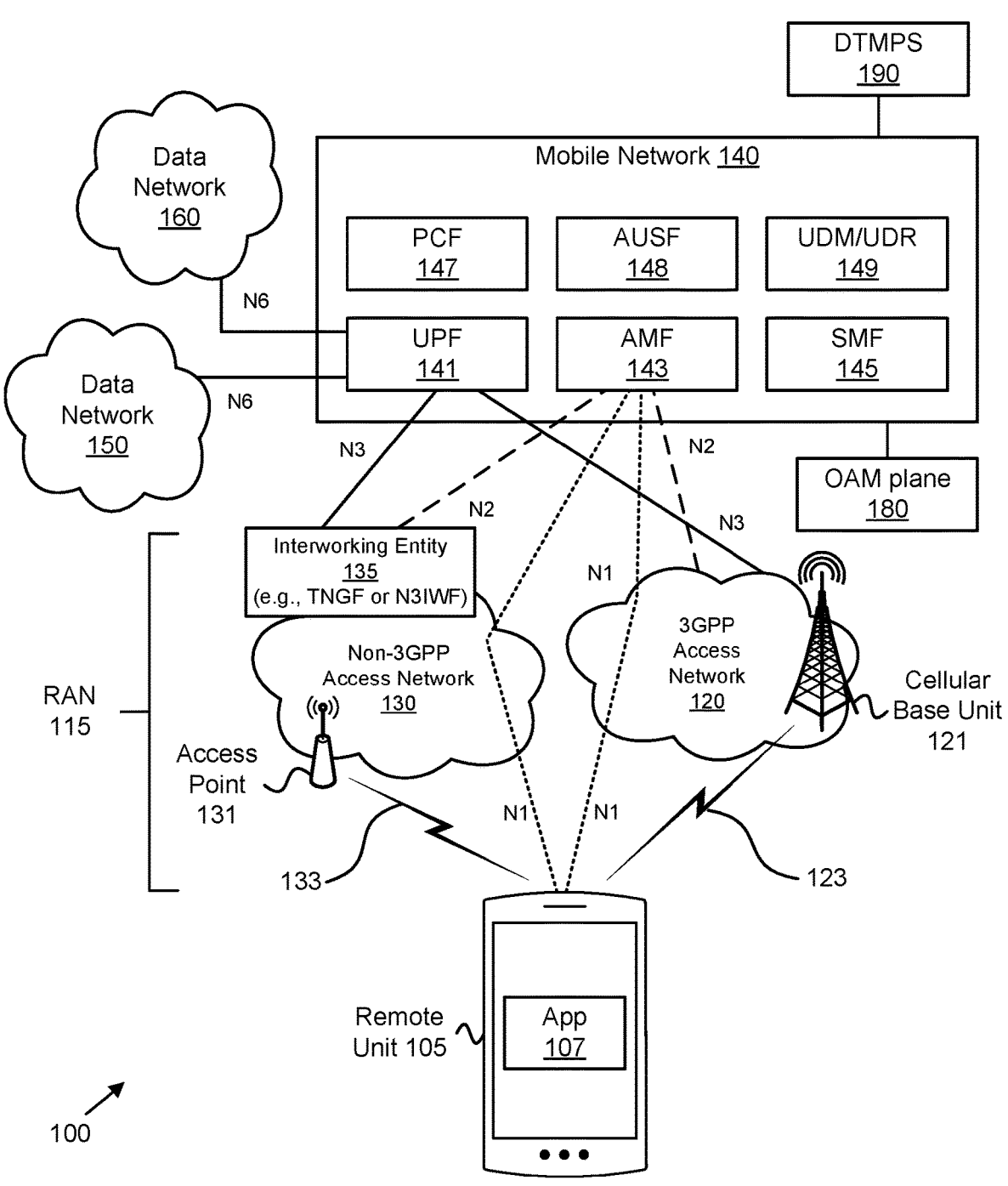
FIG. 1 is a schematic block diagram illustrating one embodiment of a wireless communication system for network slice installation-based deployment testing.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN"), wireless LAN ("WLAN"), or a wide area network ("WAN"), or the connection may be made to an external computer (for example, through the Internet using an Internet Service Provider ("ISP")).

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C." As used herein, "a member selected from the group consisting of A, B, and C and combinations thereof" includes only A, only B, only C, a combination of A and B, a combination of B and C, a combination of A and C or a combination of A, B and C.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart diagrams and/or block diagrams.

The code may also be stored in a storage device that can direct a computer, other programmable data processing apparatus, or other devices to function in a particular manner, such that the instructions stored in the storage device produce an article of manufacture including instructions which implement the function/act specified in the flowchart diagrams and/or block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the flowchart diagrams and/or block diagrams.

The flowchart diagrams and/or block diagrams in the Figures illustrate the architecture, functionality, and operation of possible implementations of apparatuses, systems, methods, and program products according to various embodiments. In this regard, each block in the flowchart diagrams and/or block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Generally, the present disclosure describes systems, methods, and apparatuses for network slice installation-based deployment testing. In certain embodiments, the methods may be performed using computer code embedded on a computer-readable medium. In certain embodiments, an apparatus or system may include a computer-readable medium containing computer-readable code which, when executed by a processor, causes the apparatus or system to perform at least a portion of the below described solutions.

Telecom networks are becoming more software based. The 5G architecture, particularly in management and control plane, is increasingly made up of virtualized software entities that can regularly be updated. A typical method for doing this is using a continuous integration continuous delivery ("CI-CD") pipeline. Once a new version of the software is delivered to the pipeline by a vendor, the operator my perform some initial testing while the software exists in the deployment repository. However, not all day-to-day situations can be captured by testing and newer software may still be prone to unforeseen issues. Currently, there is no automated way for an operator to roll out this new software into deployment other than possibly a complete manual update.

Thus, a problem that the solutions herein solve is when a new piece of software is delivered to the CI-CD system, the software needs to be tested before deployment in the telecom network, e.g., a 5G network. New software in telecom systems is rarely updated, and when it is, it usually causes significant downtime because the update procedure is manual. Moreover, after updating the software, there is no way for the operator to be confident that the update is error proof.

FIG. 1 depicts a wireless communication system 100 for network slice installation-based deployment testing, according to embodiments of the disclosure. In one embodiment, the wireless communication system 100 includes at least one remote unit 105, a Fifth-Generation Radio Access Network ("5G-RAN") 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit 105 communicates with the 3GPP access network 120 using 3GPP communication links 123 and/or communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the RAN 120 is compliant with the 5G system specified in the Third Generation Partnership Project ("3GPP") specifications. For example, the RAN 120 may be a NG-RAN, implementing NR RAT and/or LTE RAT. In another example, the RAN 120 may include non-3GPP RAT (e.g., Wi-Fi® or Institute of Electrical and Electronics Engineers ("IEEE") 802.11-family compliant WLAN). In another implementation, the RAN 120 is compliant with the LTE system specified in the 3GPP specifications. More generally, however, the wireless communication system 100 may implement some other open or proprietary communication network, for example Worldwide Interoperability for Microwave Access ("WiMAX") or IEEE 802.16-family standards, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle onboard computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as the UEs, subscriber units, mobiles, mobile stations, users, terminals, mobile terminals, fixed terminals, subscriber stations, user terminals, wireless transmit/receive unit ("WTRU"), a device, or by other terminology used in the art. In various embodiments, the remote unit 105 includes a subscriber identity and/or identification module ("SIM") and the mobile equipment ("ME") providing mobile termination functions (e.g., radio transmission, handover, speech encoding and decoding, error detection and correction, signaling and access to the SIM). In certain embodiments, the remote unit 105 may include a terminal equipment ("TE") and/or be embedded in an appliance or device (e.g., a computing device, as described above).

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150 or in the data network 160) via a network connection with the mobile core network 140. For example, an application 107 (e.g., web browser, media client, telephone and/or Voice-over-Internet-Protocol ("VOIP") application) in a remote unit 105 may trigger the remote unit 105 to establish a protocol data unit ("PDU") session (or other data connection) with the mobile core network 140 via the 5G-RAN 115 (i.e., via the 3GPP access network 120 and/or non-3GPP network 130). The mobile core network 140 then relays traffic between the remote unit 105 and the remote host using the PDU session. The PDU session represents a logical connection between the remote unit 105 and a User Plane Function ("UPF") 141.

In order to establish the PDU session (or PDN connection), the remote unit 105 must be registered with the mobile core network 140 (also referred to as "attached to the mobile core network" in the context of a Fourth Generation ("4G") system). Note that the remote unit 105 may establish one or more PDU sessions (or other data connections) with the mobile core network 140. As such, the remote unit 105 may have at least one PDU session for communicating with the packet data network 150. Additionally—or alternatively—the remote unit 105 may have at least one PDU session for communicating with the packet data network 160. The remote unit 105 may establish additional PDU sessions for communicating with other data networks and/or other communication peers.

In the context of a 5G system ("5GS"), the term "PDU Session" refers to a data connection that provides end-to-end ("E2E") user plane ("UP") connectivity between the remote unit 105 and a specific Data Network ("DN") through the UPF 131. A PDU Session supports one or more Quality of Service ("QoS") Flows. In certain embodiments, there may be a one-to-one mapping between a QoS Flow and a QoS profile, such that all packets belonging to a specific QoS Flow have the same 5G QOS Identifier ("5QI").

In the context of a 4G/LTE system, such as the Evolved Packet System ("EPS"), a Packet Data Network ("PDN") connection (also referred to as EPS session) provides E2E UP connectivity between the remote unit and a PDN. The PDN connectivity procedure establishes an EPS Bearer, i.e., a tunnel between the remote unit 105 and a Packet Gateway ("PGW", not shown) in the mobile core network 130. In certain embodiments, there is a one-to-one mapping between an EPS Bearer and a QoS profile, such that all packets belonging to a specific EPS Bearer have the same QoS Class Identifier ("QCI").

As described in greater detail below, the remote unit 105 may use a first data connection (e.g., PDU Session) established with the first mobile core network 130 to establish a second data connection (e.g., part of a second PDU session) with the second mobile core network 140. When establishing a data connection (e.g., PDU session) with the second mobile core network 140, the remote unit 105 uses the first data connection to register with the second mobile core network 140.

The cellular base units 121 may be distributed over a geographic region. In certain embodiments, a cellular base unit 121 may also be referred to as an access terminal, a base, a base station, a Node-B ("NB"), an Evolved Node B (abbreviated as eNodeB or "eNB," also known as Evolved Universal Terrestrial Radio Access Network ("E-UTRAN") Node B), a 5G/NR Node B ("gNB"), a Home Node-B, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121. Note that during NR operation on unlicensed spectrum (referred to as "NR-U"), the base unit 121 and the remote unit 105 communicate over unlicensed (e.g., shared) radio spectrum.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface. While depicted as outside the mobile core network 140, in other embodiments the interworking entity 135 may be a part of the core network. While depicted as outside the non-3GPP RAN 130, in other embodiments the interworking entity 135 may be a part of the non-3GPP RAN 130.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes at least one UPF ("UPF") 141. The mobile core network 140 also includes multiple control plane functions including, but not limited to, an Access and Mobility Management Function ("AMF") 143 that serves the 5G-RAN 115, a Session Management Function ("SMF") 145, a Policy Control Function ("PCF") 146, an Authentication Server Function ("AUSF") 147, a Unified Data Management ("UDM") and Unified Data Repository function ("UDR").

The UPF(s) 141 is responsible for packet routing and forwarding, packet inspection, QoS handling, and external PDU session for interconnecting Data Network ("DN"), in the 5G architecture. The AMF 143 is responsible for termination of NAS signaling, NAS ciphering & integrity protection, registration management, connection management, mobility management, access authentication and authorization, security context management. The SMF 145 is responsible for session management (i.e., session establishment, modification, release), remote unit (i.e., UE) IP address allocation & management, DL data notification, and traffic steering configuration for UPF for proper traffic routing.

The PCF 146 is responsible for unified policy framework, providing policy rules to CP functions, access subscription information for policy decisions in UDR. The AUSF 147 acts as an authentication server.

The UDM is responsible for generation of Authentication and Key Agreement ("AKA") credentials, user identification handling, access authorization, subscription management. The UDR is a repository of subscriber information and can be used to service a number of network functions. For example, the UDR may store subscription data, policy-related data, subscriber-related data that is permitted to be exposed to third party applications, and the like. In some embodiments, the UDM is co-located with the UDR, depicted as combined entity "UDM/UDR" 149.

In various embodiments, the mobile core network 140 may also include an Network Exposure Function ("NEF") (which is responsible for making network data and resources easily accessible to customers and network partners, e.g., via one or more APIs), a Network Repository Function ("NRF") (which provides NF service registration and discovery, enabling NFs to identify appropriate services in one another and communicate with each other over Application Programming Interfaces ("APIs")), or other NFs defined for the 5GC. In certain embodiments, the mobile core network 140 may include an authentication, authorization, and accounting ("AAA") server.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1 for ease of illustration, but their support is assumed.

Although specific numbers and types of network functions are depicted in FIG. 1, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1 depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like.

For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

The Operations, Administration and Maintenance ("OAM") 180 is involved with the operating, administering, managing and maintaining of the system 100. "Operations" encompass automatic monitoring of environment, detecting and determining faults and alerting admins. "Administration" involves collecting performance stats, accounting data for the purpose of billing, capacity planning using Usage data and maintaining system reliability. Administration can also involve maintaining the service databases which are used to determine periodic billing. "Maintenance" involves upgrades, fixes, new feature enablement, backup and restore and monitoring the media health. In certain embodiments, the OAM 180 may also be involved with provisioning, e.g., the setting up of the user accounts, devices and services.

The Deployment Testing Management Service Producer ("DTMSP") 190 is the focus of the subject matter disclosed herein and is configured to assist in the deployment of new software to be used within the network. The DTMSP is disclosed in more detail below.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

As background, regarding dynamic software update and live testing, the network slicing feature in 5G provides telecom operators the capability to support multiple logical networks on the common physical network infrastructure. Each of these Logical networks will cater to different services and might have different operational requirements spanning across domains. Therefore, in addition to the 5G feature, it is important for operators to have the flexibility to manage these logical networks independently. Cloud Native-based platforms and tools that are widely used in the IT world have inbuilt frameworks for agile and flexible deployment. These platforms are increasingly becoming the de-facto choice for 5G Telecom Products. This highlights the importance of bringing many Cloud Native benefits like CI-CD that are essential for automation and flexibility of 5G networks. CI-CD automates and integrates the development phase, testing phase and deployment phase to improve feature velocity. Enabling CI-CD in 5G networks which includes the most transaction-intensive and time-sensitive RAN network functions is still a challenge. Dynamic software upgrades and live testing of 5G software components in production environment without service interruptions remains the main challenge that need to be solved for enabling CI-CD in 5G networks.

The ability to test the upgraded network nodes in the live network may increase the agility of 5G networks. Slicing can be used to assist in live testing. A test slice can be created/deployed, consisting of the upgraded network functions, for testing purpose. The basic principles of the live testing, in one embodiment, should be:

Test slice creation with appropriate information e.g., test cases, test duration, target network nodes, etc.

Automatic UE selection: The UE to be assigned to the test network slice can be selected minimizing the impact of testing. The UEs can be selected based on the location of the Network nodes where the upgraded software is deployed. This can be based on the current load conditions of the Network nodes. UEs can also be selected based on the UE characteristics like UE mobility and UE capabilities like Dual connectivity.

Deployment location selection for the upgraded node: The location of the upgraded node can be selected minimizing the impact of testing. The location of the Networks nodes that needs to be upgraded and tested can be selected based on load conditions of the Network nodes at a given location. The location of the node can also be based on the availability of UEs for testing in each location.

Feature testing: It should be possible to select a set of features, among the list of all features, to be tested. For example, if Network function gNB-CU is upgraded with features X, Y, Z but feature Y has dependency on the NG interface with 5GC. In this case, only feature X, Z should be tested till the 5GC is also upgraded with feature Y.

When a new version of software used in a telecom operator network slice instance of a communication service instance is delivered, it needs to be deployed within the network. However, this deployment may not be able to proceed all at once and may still require the operator to trust the new version even after all the tests have passed.

In general, this disclosure presents a DTMSP that is notified of a new version of software for the network. The DTMSP determines which slices need to be updated with the new software version and fetches an update plan, e.g., either from a repository or the respective network slice consumer. Based on the plan a new "test version" of the slice is deployed and UEs are handed over to this slice according to the plan. The performance of the new slice is monitored and may even be compared to that of the old version running on the same network. If the performance of the new network is satisfactory further UEs are assigned to the new slice or communication service till none of the users are using the old network slice, which can then be deleted.

This disclosure provides solutions for automatic testing of new software components (such as new NFs) belonging to existing network slices or communication services. In one embodiment, this automates the final step in the software update process, which may reduce significant operating costs for the operators.

The solutions described herein may be applicable to software updates that are delivered for a previous version of the software that is already deployed in the network. Furthermore, for the purposes of this disclosure, it is assumed that existing tests in the CI-CD pipeline have succeeded. In one embodiment, the subject matter disclosed herein is applicable to cases where NFs can be deployed in a live telecom network managed by an operator. In such an embodiment, the NF is in a repository such that it can be used for deployment into the operational network. The management service used for this purpose may be referred to as a software inventory management service.

In one embodiment of the high-level solution, the DTMSP can create a new network slice instance identical or substantially similar to the one where the previous or old software artifact is currently used. In the new network slice or consumer service, the new software version replaces the old software. UEs may be incrementally assigned to this new slice according to a replacement plan or replacement policy and its fault and performance are monitored. Any deterioration of the performance as compared to that of the previous version, or the occurrence of any errors would then require a roll back of the deployment procedure.

In general, in one embodiment, the proposed solution is as follows:

1. The DTMSP may be configured with a new policy or software replacement plan per software entity;
2. The DTMSP receives a notification of new software;
3. Check if there is a policy/plan for the new software per network slice instance/deployed consumer service;
4. If yes, create a consumer service/network slice with the new version of software;
5. Configure the control plan and start transfer users to the new consumer service or network slice instance;
6. Check performance:
   a. if performance is good, proceed with the plan to increase users until all users are transferred and delete old version of the software. Report software update successful; else
   b. if performance is bad or errors are reported, remove users until the new software can be deleted. Report software not usable.

In one embodiment, the update plan or the update policy provides the path used to update the UE for a given communication service/network slice instance and may further include the software artifact in combination with the network slice instance ("NSI"). In addition, the update policy/plan may define conditional checks under which the update may start, proceed or be withdrawn. An example of an update plan on a per slice instance basis is shown in Table 1 below.

e.g., the first 3 days at any point in time triggers a replacement cancellation (see step 4). This information helps automate the software deployment process. There may be default update plans or policies that are used when those for the specific software artifact or NSI are missing.

Figure 2A:
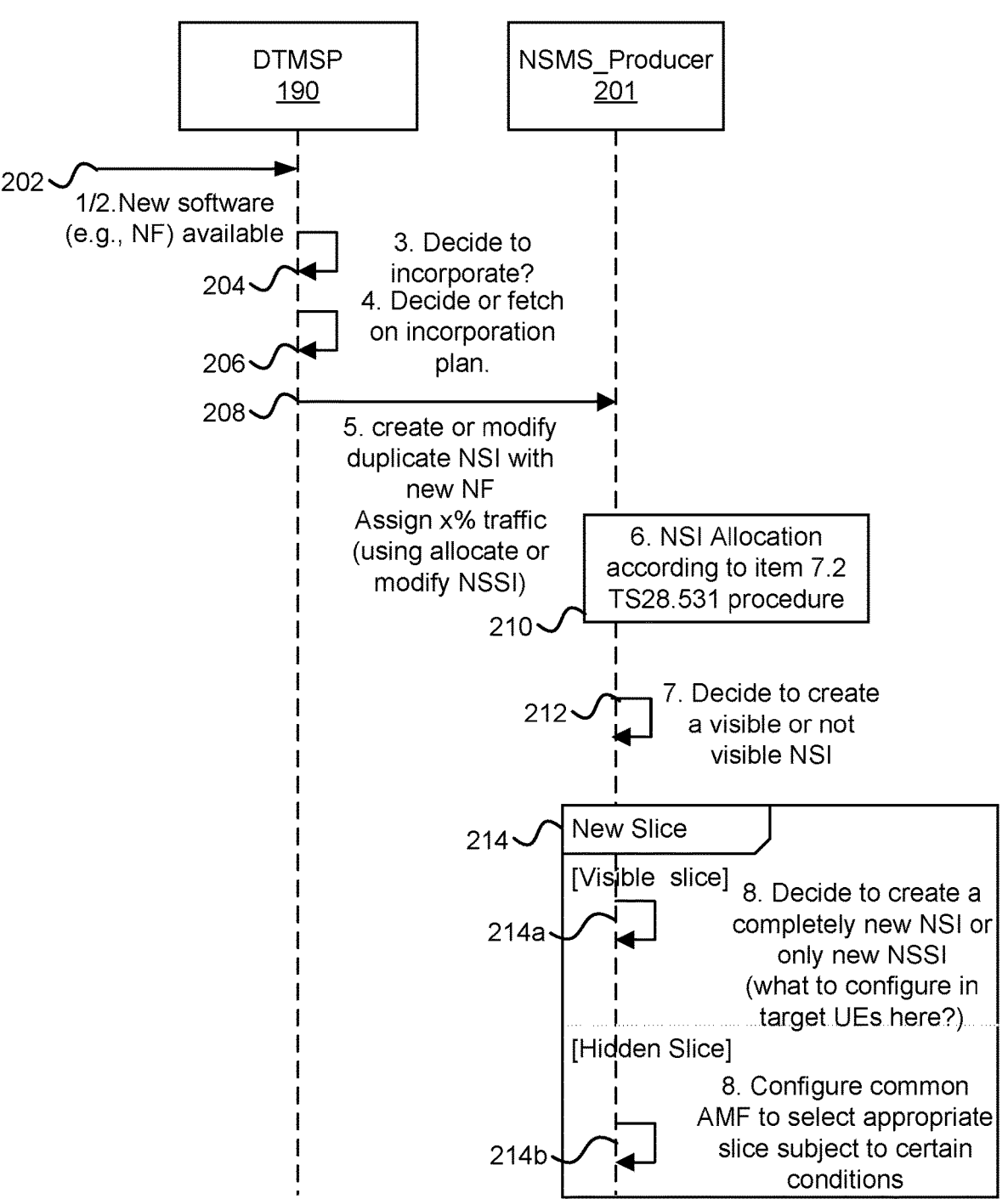
FIG. 2A is a procedure flow diagram illustrating one embodiment of network slice installation-based deployment testing.
Figure 2B:
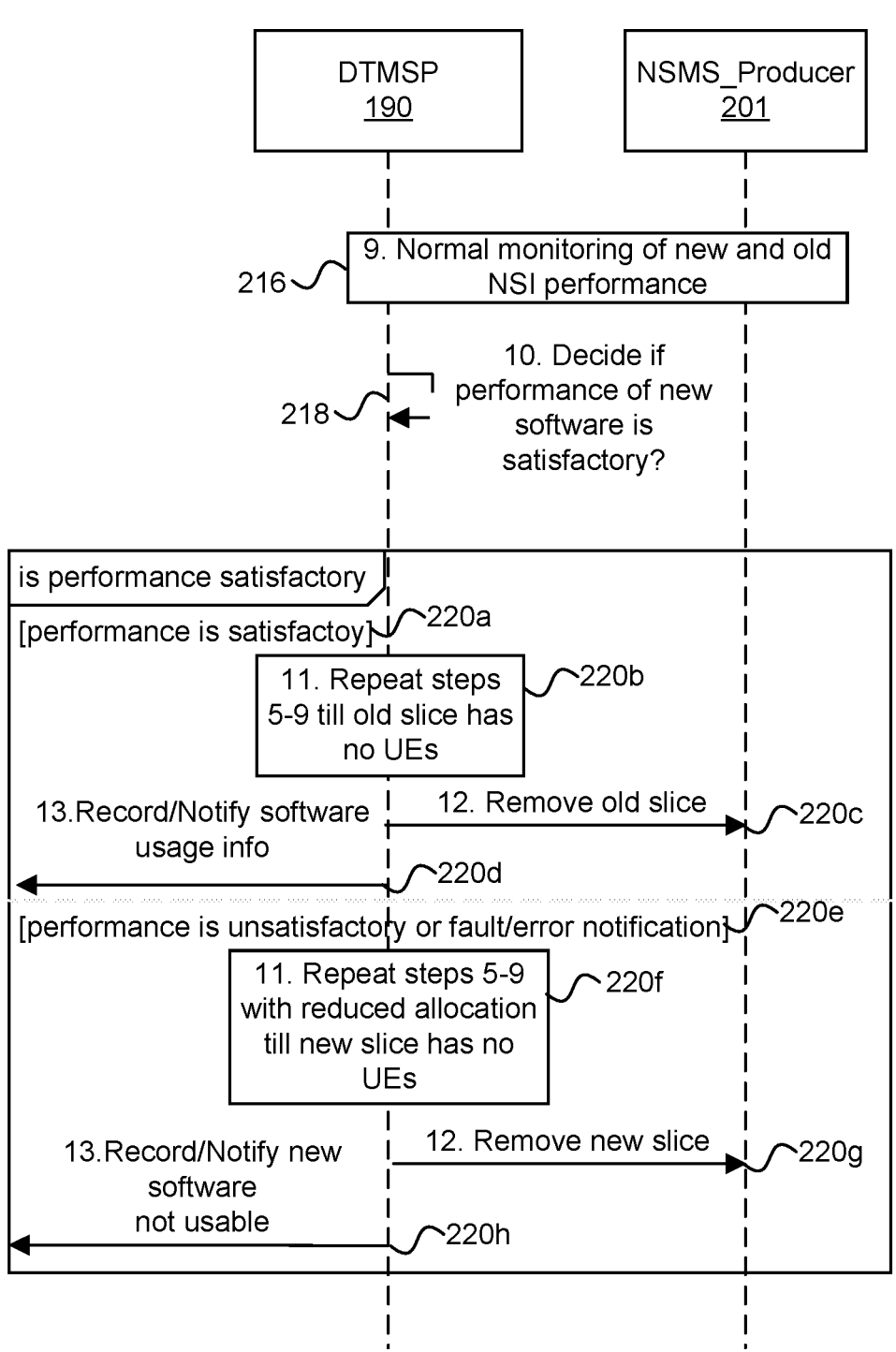
FIG. 2B is a continuation of the procedure flow diagram in FIG. 2A.

FIGS. 2A-2B depict a signal flow diagram illustrating the steps involved in the disclosed solution where the DTMSP 190 is a consumer of the network slice management producer ("NSMS Producer") 201. It is noted that as a prerequisite, in one embodiment, the DTMSP 190 can receive notifications of changes in the software. The notifications may be limited to changes in particular software artifacts (e.g., existing NFs) that interest or are currently being used by a particular (set of) NSI. Further, it is noted that, in one embodiment, the DTMSP 190 may be collocated with the NSMS Provider 201.

In one embodiment, at steps 1 and 2, a new version of an existing software artifact, e.g., a new NF version (which is used as the example in FIGS. 2A-2B) becomes available and the DTMSP 190 receives a notification (see messaging 202), e.g., from the OAM 180, when the existing NF has a new NF version available.

In one embodiment, at step 3, optionally, the DTMSP 190 may have the capability and decides (see messaging 204) whether to use this new version of software in its network or not. This may be based on the reliability and the overall issues of the existing NF version and/or the features promised by the new NF. For example, if the existing NF version is error prone then the operator may choose to try the new NF version.

In one embodiment, at step 4, if the DTMSP 190 in step 3 decides to incorporate the new NF version, then an incorporation plan is fetched (see messaging 206). This plan may be configured in the DTMSP 190 by the original NSI

TABLE 1

| Network Slice Instance ID | Replacement step | Replacement condition | Cancel when |
|---|---|---|---|
| ID123 | 1. User Groups IDs U1, U2, U3 | New NF Version (NF used in NSI ID123) | Error |
| | 2. Group IDs U4, U5, U6 | Replacement group 1 performance within 10% or better for 5 weeks | Error or Performance still below 10% after 3 days for more than a day |
| | 3. All users | After replacement group 2 performance within 10% or better for 6 weeks | Error or Performance still below 10% after 3 days for more than a day |
| | 4. Delete old slice ID | After replacement group 3 performance within 10% or better for 3 weeks | Error or Performance still below 10% after 3 days for more than a day |

Table 1 provides an example of what a replacement plan could look like. In the table. the replacement plan happens in four steps. In step 1, when the condition (e.g., a new NF version) is met, users in groups U1 through U3 are moved to the new network slice instance identified by the NSI ID123 after the new NSI is installed and operational. If the performance is stable and within a threshold performance, e.g., 10% below the performance of the last NSI version or better for certain amount of time, e.g., 5 weeks, then additional user groups are assigned to the NSI (see step 2). The process continues further as described until all users have been assigned to the new network slice instance (see step 3).

On the other hand, any errors, or a performance lower than a threshold, e.g., 10% after a certain amount of time, owner that requested the NSI or may need to be fetched by the NSI owner. This plan may decide how quickly or slowly the system is migrated to the new version of the NF. For example, if the old NF version has severe reliability issues, then the new NF version may be integrated very quickly. In contrast, if the old version of the NF is highly reliable, then the handover to the new NF version may be done slowly.

In one embodiment, at step 5, the DTMSP 190 requests (see messaging 208) a new network slice and provides the incorporation plan for the new network slice instance. The NSMS Provider 201 may notify the appropriate consumer that requested the slice that a new version of the network slice with the new NF software is being deployed.

In one embodiment, at step 6, the new slice with the new NF software is deployed (see block 210), e.g., according to procedures in item 7.2 of TS 28.531 NSI allocation.

In one embodiment, at step 7, the NSMS Provider 201 may decide (see messaging 212) to create an NSI visible to the UE or not. Note that the order of steps could be inter-changed in some implementations.

At step 8, in one embodiment, the NSMS Producer 201 applies (see block 214) the appropriate configurations of the control plane network functions e.g., as described in TS 23.501 clause 5.15.8 "Configuration of Network Slice availability in a PLMN." After deployment and configuration in the network is completed, in one embodiment, the OAM 180 system updates the subscription data in the UDR 139.

For instance, in one example embodiment, if the new slice is visible to UEs (see messaging 214a) and if the new slice instance is assigned to belong to a new S-NSSAI, then the new slice may be used by the subscribers (e.g., UEs) after the subscription data of the UEs has been updated. In such an embodiment, the subscription data of the UEs, which are about to use the new slice instance, may need to be updated. This may require an update on the subscription data of the impacted UEs in the UDR 139, e.g., as described in TS 23.501 clause 5.15.3 "Subscription aspects." Once the subscription data is updated, the procedure as described in TS 23.501 clause 5.15.5.2.2 "Modification of the Set of Network Slice(s) for a UE" may be applied to the selected set of UEs.

In a second example embodiment, if the new slice is not visible to UEs (see messaging 214b), the newly deployed NSI is associated with an existing S-NSSAI. It is possible, in one embodiment, that multiple NSIs are associated with the same S-NSSAI in the same or in different tracking areas. In this case, the OAM 180 system may need to update the AMF 143 and/or a network slice selection function ("NSSF"). The selection of an NSI ID corresponding to a requested and subscribed S-NSSAI may be performed in the AMF 143 or the NSSF, the latter requested by the AMF 143. When UE(s) perform a registration procedure in this tracking area, the AMF 143 (locally or with the support of the NSSF) may select the newly deployed NSI ID for this UE. The selected NSI ID may be used for the selection of further control plane network functions, e.g., NFs, NRF (to select NFs/services within the selected NSI), or during PDU Session establishment.

At step 9, in one embodiment, normal monitoring procedures are performed (see block 216), e.g., in accordance with performances measurement services and procedures defined in TS28.540.

In one embodiment, at step 10, the DTMSP 190 decides (see messaging 218) if the performance is good enough to assign further UEs to the new network slice instance or bad enough to remove the In one embodiment, if the performance is satisfactory 220a and if the condition according to the plan has been met, at step 11 (see block 220b), repeat steps 5-9. In one embodiment, however, at step 5, instead of creating a new slice instance, the new slice instance is modified so it can support more users, e.g., UEs. Further, in one embodiment, users are assigned to the new NSI according to the plan.

In one embodiment, if the condition to remove the old slice is met, the DTMSP 190 notifies the NSMS Producer 201 to remove the old slice instance (see messaging 220c) after assigning all of the users to the new slice instance. In one embodiment, the DTMSP 190 issues an appropriate notification of the software replacement (see messaging 220d).

In one embodiment, if the performance is not adequate or is unsatisfactory 220e and if the condition for cancelling deployment is met, at step 11 (see block 220f), repeat steps 5-9. In one embodiment, however, at step 5, instead of creating a new slice instance, the new slice instance is modified so it can support less users, e.g., UEs.

In one embodiment, if all users are assigned back to the old slice instance, the DTMSP 190 notifies the NSMS Producer 201 to remove the new slice instance (see messaging 220g). In one embodiment, the DTMSP 190 issues an appropriate notification of the software replacement failure (see messaging 220h).

Figure 3:
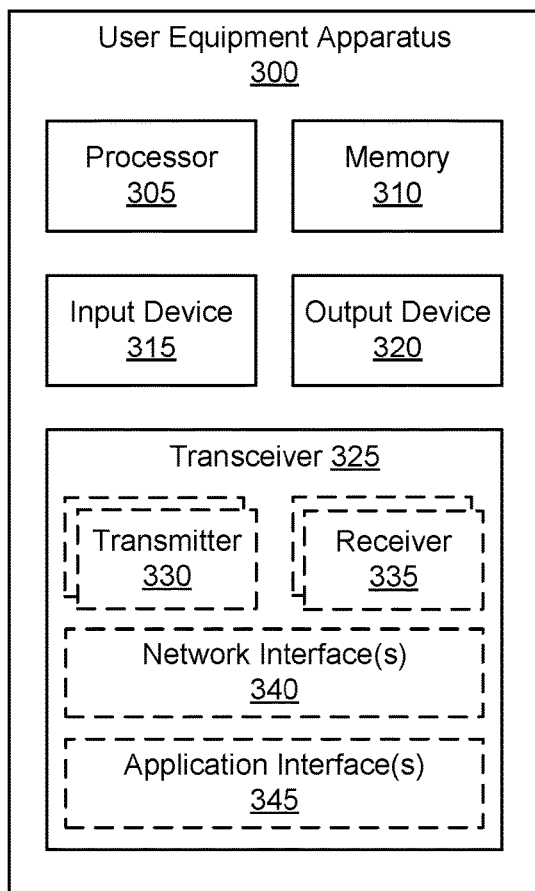
FIG. 3 is a block diagram illustrating one embodiment of a user equipment apparatus that may be used for network slice installation-based deployment testing.

FIG. 3 depicts a user equipment apparatus 300 that may be used for network slice installation-based deployment testing, according to embodiments of the disclosure. In various embodiments, the user equipment apparatus 300 is used to implement one or more of the solutions described above. The user equipment apparatus 300 may be one embodiment of a UE, such as the remote unit 105 and/or the UE 205, as described above. Furthermore, the user equipment apparatus 300 may include a processor 305, a memory 310, an input device 315, an output device 320, and a transceiver 325. In some embodiments, the input device 315 and the output device 320 are combined into a single device, such as a touchscreen. In certain embodiments, the user equipment apparatus 300 may not include any input device 315 and/or output device 320. In various embodiments, the user equipment apparatus 300 may include one or more of: the processor 305, the memory 310, and the transceiver 325, and may not include the input device 315 and/or the output device 320.

As depicted, the transceiver 325 includes at least one transmitter 330 and at least one receiver 335. Here, the transceiver 325 communicates with one or more base units 121. Additionally, the transceiver 325 may support at least one network interface 340 and/or application interface 345. The application interface(s) 345 may support one or more APIs. The network interface(s) 340 may support 3GPP reference points, such as Uu and PC5. Other network interfaces 340 may be supported, as understood by one of ordinary skill in the art.

The processor 305, in one embodiment, may include any known controller capable of executing computer-readable instructions and/or capable of performing logical operations. For example, the processor 305 may be a microcontroller, a microprocessor, a central processing unit ("CPU"), a graphics processing unit ("GPU"), an auxiliary processing unit, a field programmable gate array ("FPGA"), a digital signal processor ("DSP"), a co-processor, an application-specific processor, or similar programmable controller. In some embodiments, the processor 305 executes instructions stored in the memory 310 to perform the methods and routines described herein. The processor 305 is communicatively coupled to the memory 310, the input device 315, the output device 320, and the transceiver 325. In certain embodiments, the processor 305 may include an application processor (also known as "main processor") which manages application-domain and operating system ("OS") functions and a baseband processor (also known as "baseband radio processor") which manages radio functions.

The memory 310, in one embodiment, is a computer readable storage medium. In some embodiments, the memory 310 includes volatile computer storage media. For example, the memory 310 may include a RAM, including dynamic RAM ("DRAM"), synchronous dynamic RAM ("SDRAM"), and/or static RAM ("SRAM"). In some embodiments, the memory 310 includes non-volatile computer storage media. For example, the memory 310 may include a hard disk drive, a flash memory, or any other suitable non-volatile computer storage device. In some embodiments, the memory 310 includes both volatile and non-volatile computer storage media.

In some embodiments, the memory 310 stores data related to CSI enhancements for higher frequencies. For example, the memory 310 may store parameters, configurations, resource assignments, policies, and the like as described above. In certain embodiments, the memory 310 also stores program code and related data, such as an operating system or other controller algorithms operating on the user equipment apparatus 300, and one or more software applications.

The input device 315, in one embodiment, may include any known computer input device including a touch panel, a button, a keyboard, a stylus, a microphone, or the like. In some embodiments, the input device 315 may be integrated with the output device 320, for example, as a touchscreen or similar touch-sensitive display. In some embodiments, the input device 315 includes a touchscreen such that text may be input using a virtual keyboard displayed on the touchscreen and/or by handwriting on the touchscreen. In some embodiments, the input device 315 includes two or more different devices, such as a keyboard and a touch panel.

The output device 320, in one embodiment, is designed to output visual, audible, and/or haptic signals. In some embodiments, the output device 320 includes an electronically controllable display or display device capable of outputting visual data to a user. For example, the output device 320 may include, but is not limited to, an LCD display, an LED display, an OLED display, a projector, or similar display device capable of outputting images, text, or the like to a user. As another, non-limiting, example, the output device 320 may include a wearable display separate from, but communicatively coupled to, the rest of the user equipment apparatus 300, such as a smart watch, smart glasses, a heads-up display, or the like. Further, the output device 320 may be a component of a smart phone, a personal digital assistant, a television, a table computer, a notebook (laptop) computer, a personal computer, a vehicle dashboard, or the like.

In certain embodiments, the output device 320 includes one or more speakers for producing sound. For example, the output device 320 may produce an audible alert or notification (e.g., a beep or chime). In some embodiments, the output device 320 includes one or more haptic devices for producing vibrations, motion, or other haptic feedback. In some embodiments, all, or portions of the output device 320 may be integrated with the input device 315. For example, the input device 315 and output device 320 may form a touchscreen or similar touch-sensitive display. In other embodiments, the output device 320 may be located near the input device 315.

The transceiver 325 includes at least transmitter 330 and at least one receiver 335. The transceiver 325 may be used to provide UL communication signals to a base unit 121 and to receive DL communication signals from the base unit 121, as described herein. Similarly, the transceiver 325 may be used to transmit and receive SL signals (e.g., V2X communication), as described herein. Although only one transmitter 330 and one receiver 335 are illustrated, the user equipment apparatus 300 may have any suitable number of transmitters 330 and receivers 335. Further, the transmitter(s) 330 and the receiver(s) 335 may be any suitable type of transmitters and receivers. In one embodiment, the transceiver 325 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 325, transmitters 330, and receivers 335 may be implemented as physically separate components that access a shared hardware resource and/or software resource, such as for example, the network interface 340.

In various embodiments, one or more transmitters 330 and/or one or more receivers 335 may be implemented and/or integrated into a single hardware component, such as a multi-transceiver chip, a system-on-a-chip, an ASIC, or other type of hardware component. In certain embodiments, one or more transmitters 330 and/or one or more receivers 335 may be implemented and/or integrated into a multi-chip module. In some embodiments, other components such as the network interface 340 or other hardware components/circuits may be integrated with any number of transmitters 330 and/or receivers 335 into a single chip. In such embodiment, the transmitters 330 and receivers 335 may be logically configured as a transceiver 325 that uses one more common control signals or as modular transmitters 330 and receivers 335 implemented in the same hardware chip or in a multi-chip module.

In one embodiment, the processor 305 is configured to detect that a new version of network software is available. In one embodiment, the processor 350 is configured to determine an incorporation plan for migrating to the new version of the network software. In one embodiment, the processor 305 is configured to request a new network slice instance for deploying the new version of the network software according to the determined incorporation plan, wherein one or more UE devices are assigned to the new network slice instance. In one embodiment, the processor 305 is configured to monitor performance of the one or UE devices using the new version of the network software in the new network slice instance.

In one embodiment, the new network slice instance is assigned to a new S-NSSAI such that the new network slice instance is visible to the one or more UE devices, the subscription data of the one or more UE devices updated for the new network slice instance.

In one embodiment, the new network slice instance is associated with an existing S-NSSAI such that the new network slice is not visible to the one or more UE devices, the one or more UE devices assigned to the new network slice during a registration procedure.

In one embodiment, the processor 305 is configured to receive, via the transceiver 325, a notification in response to the new version of the network software being available for deployment.

In one embodiment, the processor 305 is configured to deploy the new version of the network software on a current network that the one or more UE devices are connected to according to the incorporation plan.

In one embodiment, the incorporation plan comprises an identifier for the new network slice instance and one or more steps for implementing the incorporation plan, the one or more steps each comprising a replacement condition and a cancel condition.

In one embodiment, a step of the one or more steps defines a group of UE devices of the one or more UE devices to migrate to the new network slice instance to use the new version of the network software.

In one embodiment, the processor 305 is configured to proceed to a next step of the incorporation plan in response to the monitored performance of the one or UE devices satisfying the replacement condition for a step of the incorporation plan.

In one embodiment, the processor 305 is configured to remove a current network slice instance that the one or more UE devices were previously connected to in response to each of the one or more UE devices being migrated to the new network slice instance.

In one embodiment, the processor 305 is configured to cancel deployment of the new software version in the new network slice instance in response to the monitored performance of the one or more UE devices not satisfying the replacement condition for a step of the incorporation plan.

In one embodiment, cancelling deployment comprises modifying a number of UE devices that the new network slice instance can support until the monitored performance satisfies the replacement condition for the step of the incorporation plan.

In one embodiment, the processor 305 is configured to remove the new network slice instance in response to removing each UE device that is migrated to the new network slice instance back to a previous network slice instance.

In one embodiment, the processor 305 is configured to transmit, via the transceiver 325, a notification indicating one of success and failure of deployment of the new version of the network software in the new network slice instance.

Figure 4:
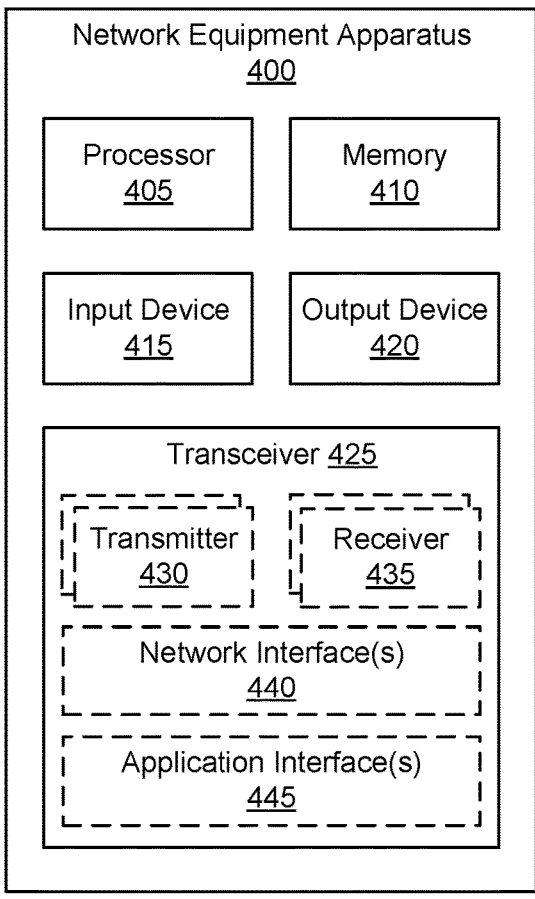
FIG. 4 is a block diagram illustrating one embodiment of a network apparatus that may be used for network slice installation-based deployment testing.

FIG. 4 depicts one embodiment of a network apparatus 400 that may be used for network slice installation-based deployment testing, according to embodiments of the disclosure. In some embodiments, the network apparatus 400 may be one embodiment of a RAN node and its supporting hardware, such as the base unit 121 and/or gNB, described above. Furthermore, network apparatus 400 may include a processor 405, a memory 410, an input device 415, an output device 420, and a transceiver 425. In certain embodiments, the network apparatus 400 does not include any input device 415 and/or output device 420.

As depicted, the transceiver 425 includes at least one transmitter 430 and at least one receiver 435. Here, the transceiver 425 communicates with one or more remote units 105. Additionally, the transceiver 425 may support at least one network interface 440 and/or application interface 445. The application interface(s) 445 may support one or more APIs. The network interface(s) 440 may support 3GPP reference points, such as Uu, N1, N2, N3, N5, N6 and/or N7 interfaces. Other network interfaces 440 may be supported, as understood by one of ordinary skill in the art.

When implementing an NEF, the network interface(s) 440 may include an interface for communicating with an application function (i.e., N5) and with at least one network function (e.g., UDR, SFC function, UPF) in a mobile communication network, such as the mobile core network 130.

The processor 405, in one embodiment, may include any known controller capable of executing computer-readable instructions and/or capable of performing logical operations. For example, the processor 405 may be a microcontroller, a microprocessor, CPU, a GPU, an auxiliary processing unit, a FPGA, a DSP, a co-processor, an application-specific processor, or similar programmable controller. In some embodiments, the processor 405 executes instructions stored in the memory 410 to perform the methods and routines described herein. The processor 405 is communicatively coupled to the memory 410, the input device 415, the output device 420, and the transceiver 425. In certain embodiments, the processor 405 may include an application processor (also known as "main processor") which manages application-domain and OS functions and a baseband processor (also known as "baseband radio processor") which manages radio function. In various embodiments, the processor 405 controls the network apparatus 400 to implement the above described network entity behaviors (e.g., of the gNB) for network slice installation-based deployment testing.

The memory 410, in one embodiment, is a computer readable storage medium. In some embodiments, the memory 410 includes volatile computer storage media. For example, the memory 410 may include a RAM, including DRAM, SDRAM, and/or SRAM. In some embodiments, the memory 410 includes non-volatile computer storage media. For example, the memory 410 may include a hard disk drive, a flash memory, or any other suitable non-volatile computer storage device. In some embodiments, the memory 410 includes both volatile and non-volatile computer storage media.

In some embodiments, the memory 410 stores data relating to CSI enhancements for higher frequencies. For example, the memory 410 may store parameters, configurations, resource assignments, policies, and the like as described above. In certain embodiments, the memory 410 also stores program code and related data, such as an operating system ("OS") or other controller algorithms operating on the network apparatus 400, and one or more software applications.

The input device 415, in one embodiment, may include any known computer input device including a touch panel, a button, a keyboard, a stylus, a microphone, or the like. In some embodiments, the input device 415 may be integrated with the output device 420, for example, as a touchscreen or similar touch-sensitive display. In some embodiments, the input device 415 includes a touchscreen such that text may be input using a virtual keyboard displayed on the touchscreen and/or by handwriting on the touchscreen. In some embodiments, the input device 415 includes two or more different devices, such as a keyboard and a touch panel.

The output device 420, in one embodiment, may include any known electronically controllable display or display device. The output device 420 may be designed to output visual, audible, and/or haptic signals. In some embodiments, the output device 420 includes an electronic display capable of outputting visual data to a user. Further, the output device 420 may be a component of a smart phone, a personal digital assistant, a television, a table computer, a notebook (laptop) computer, a personal computer, a vehicle dashboard, or the like.

In certain embodiments, the output device 420 includes one or more speakers for producing sound. For example, the output device 420 may produce an audible alert or notification (e.g., a beep or chime). In some embodiments, the output device 420 includes one or more haptic devices for producing vibrations, motion, or other haptic feedback. In some embodiments, all, or portions of the output device 420 may be integrated with the input device 415. For example, the input device 415 and output device 420 may form a touchscreen or similar touch-sensitive display. In other embodiments, all, or portions of the output device 420 may be located near the input device 415.

As discussed above, the transceiver 425 may communicate with one or more remote units and/or with one or more interworking functions that provide access to one or more PLMNs. The transceiver 425 may also communicate with one or more network functions (e.g., in the mobile core network 80). The transceiver 425 operates under the control of the processor 405 to transmit messages, data, and other signals and also to receive messages, data, and other signals. For example, the processor 405 may selectively activate the transceiver (or portions thereof) at particular times in order to send and receive messages.

The transceiver 425 may include one or more transmitters 430 and one or more receivers 435. In certain embodiments, the one or more transmitters 430 and/or the one or more receivers 435 may share transceiver hardware and/or circuitry. For example, the one or more transmitters 430 and/or the one or more receivers 435 may share antenna(s), antenna tuner(s), amplifier(s), filter(s), oscillator(s), mixer(s), modulator/demodulator(s), power supply, and the like. In one embodiment, the transceiver 425 implements multiple logical transceivers using different communication protocols or protocol stacks, while using common physical hardware.

In one embodiment, the processor 405 is configured to receive, via the transceiver 425, a request to create a new network slice instance according to an incorporation plan for deployment of a new version of network software and migrating one or more UE devices to the new network slice instance. In one embodiment, the processor 405 is configured to create the new network slice instance according to the incorporation plan. In one embodiment, the processor 405 is configured to assign the new network slice instance to a new S-NSSAI or assign the new network slice instance to an existing S-NSSAI.

FIG. 5 is a flowchart diagram of a method 500 for network slice installation-based deployment testing. The method 500 may be performed by a UE as described herein, for example, the remote unit 105 and/or the user equipment apparatus 300. In some embodiments, the method 500 may be performed by a processor executing program code, for example, a microcontroller, a microprocessor, a CPU, a GPU, an auxiliary processing unit, a FPGA, or the like.

In one embodiment, the method 500 begins and detects 505 that a new version of network software is available. In one embodiment, the method 500 determines 510 an incorporation plan for migrating to the new version of the network software. In one embodiment, the method 500 requests 515 a new network slice instance for deploying the new version of the network software according to the determined incorporation plan, wherein one or more user equipment ("UE") devices are assigned to the new network slice instance. In one embodiment, the method 500 monitors 520 performance of the one or UE devices using the new version of the network software in the new network slice instance, and the method 500 ends.

FIG. 6 is a flowchart diagram of a method 600 for network slice installation-based deployment testing. The method 600 may be performed by a network node as described herein, for example, a gNB, a base unit 121, and/or the network equipment apparatus 400. In some embodiments, the method 600 may be performed by a processor executing program code, for example, a microcontroller, a microprocessor, a CPU, a GPU, an auxiliary processing unit, a FPGA, or the like.

In one embodiment, the method 600 begins and receives 605 a request to create a new network slice instance according to a incorporation plan for deployment of a new version of network software and migrating one or more user equipment ("UE") devices to the new network slice instance. In one embodiment, the method 600 creates 610 the new network slice instance according to the incorporation plan. In one embodiment. The method 600 either assigns 615 the new network slice instance to a new single network slice selection assistance information ("S-NSSAI") or assigns 620 the new network slice instance to an existing S-NSSAI, and the method 600 ends.

A first apparatus is disclosed for network slice installation-based deployment testing. The first apparatus may include a UE as described herein, for example, the remote unit 105 and/or the user equipment apparatus 300. In some embodiments, the first apparatus may include a processor executing program code, for example, a microcontroller, a microprocessor, a CPU, a GPU, an auxiliary processing unit, a FPGA, or the like.

In one embodiment, the first apparatus includes a transceiver and a processor coupled to the transceiver. In one embodiment, the processor is configured to cause the apparatus to detect that a new version of network software is available. In one embodiment, the processor is configured to cause the apparatus to determine an incorporation plan for migrating to the new version of the network software. In one embodiment, the processor is configured to cause the apparatus to request a new network slice instance for deploying the new version of the network software according to the determined incorporation plan, wherein one or more UE devices are assigned to the new network slice instance. In one embodiment, the processor is configured to cause the apparatus to monitor performance of the one or UE devices using the new version of the network software in the new network slice instance.

In one embodiment, the new network slice instance is assigned to a new S-NSSAI such that the new network slice instance is visible to the one or more UE devices, the subscription data of the one or more UE devices updated for the new network slice instance.

In one embodiment, the new network slice instance is associated with an existing S-NSSAI such that the new network slice is not visible to the one or more UE devices, the one or more UE devices assigned to the new network slice during a registration procedure.

In one embodiment, the processor is configured to cause the apparatus to receive a notification in response to the new version of the network software being available for deployment.

In one embodiment, the processor is configured to cause the apparatus to deploy the new version of the network software on a current network that the one or more UE devices are connected to according to the incorporation plan.

In one embodiment, the incorporation plan comprises an identifier for the new network slice instance and one or more steps for implementing the incorporation plan, the one or more steps each comprising a replacement condition and a cancel condition.

In one embodiment, a step of the one or more steps defines a group of UE devices of the one or more UE devices to migrate to the new network slice instance to use the new version of the network software.

In one embodiment, the processor is configured to cause the apparatus to proceed to a next step of the incorporation plan in response to the monitored performance of the one or UE devices satisfying the replacement condition for a step of the incorporation plan.

In one embodiment, the processor is configured to cause the apparatus to remove a current network slice instance that the one or more UE devices were previously connected to in response to each of the one or more UE devices being migrated to the new network slice instance.

In one embodiment, the processor is configured to cause the apparatus to cancel deployment of the new software version in the new network slice instance in response to the monitored performance of the one or more UE devices not satisfying the replacement condition for a step of the incorporation plan.

In one embodiment, cancelling deployment comprises modifying a number of UE devices that the new network slice instance can support until the monitored performance satisfies the replacement condition for the step of the incorporation plan.

In one embodiment, the processor is configured to cause the apparatus to remove the new network slice instance in response to removing each UE device that is migrated to the new network slice instance back to a previous network slice instance.

In one embodiment, the processor is configured to cause the apparatus to transmit a notification indicating one of success and failure of deployment of the new version of the network software in the new network slice instance.

A first method is disclosed for network slice installation-based deployment testing. The first method may be performed by a UE as described herein, for example, the remote unit 105 and/or the user equipment apparatus 300. In some embodiments, the first method may be performed by a processor executing program code, for example, a microcontroller, a microprocessor, a CPU, a GPU, an auxiliary processing unit, a FPGA, or the like.

In one embodiment, the first method detects that a new version of network software is available. In one embodiment, the first method determines an incorporation plan for migrating to the new version of the network software. In one embodiment, the first method requests a new network slice instance for deploying the new version of the network software according to the determined incorporation plan, wherein one or more UE devices are assigned to the new network slice instance. In one embodiment, the first method monitors performance of the one or UE devices using the new version of the network software in the new network slice instance.

In one embodiment, the new network slice instance is assigned to a new S-NSSAI such that the new network slice instance is visible to the one or more UE devices, the subscription data of the one or more UE devices updated for the new network slice instance.

In one embodiment, the new network slice instance is associated with an existing S-NSSAI such that the new network slice is not visible to the one or more UE devices, the one or more UE devices assigned to the new network slice during a registration procedure.

In one embodiment, the first method receives a notification in response to the new version of the network software being available for deployment.

In one embodiment, the first method deploys the new version of the network software on a current network that the one or more UE devices are connected to according to the incorporation plan.

In one embodiment, the incorporation plan comprises an identifier for the new network slice instance and one or more steps for implementing the incorporation plan, the one or more steps each comprising a replacement condition and a cancel condition.

In one embodiment, a step of the one or more steps defines a group of UE devices of the one or more UE devices to migrate to the new network slice instance to use the new version of the network software.

In one embodiment, the first method proceeds to a next step of the incorporation plan in response to the monitored performance of the one or UE devices satisfying the replacement condition for a step of the incorporation plan.

In one embodiment, the first method removes a current network slice instance that the one or more UE devices were previously connected to in response to each of the one or more UE devices being migrated to the new network slice instance.

In one embodiment, the first method cancels deployment of the new software version in the new network slice instance in response to the monitored performance of the one or more UE devices not satisfying the replacement condition for a step of the incorporation plan.

In one embodiment, cancelling deployment comprises modifying a number of UE devices that the new network slice instance can support until the monitored performance satisfies the replacement condition for the step of the incorporation plan.

In one embodiment, the first method removes the new network slice instance in response to removing each UE device that is migrated to the new network slice instance back to a previous network slice instance.

In one embodiment, the first method transmits a notification indicating one of success and failure of deployment of the new version of the network software in the new network slice instance.

A second apparatus is disclosed for network slice installation-based deployment testing. The second apparatus may include a network node as described herein, for example, a gNB, a base unit 121, and/or the network equipment apparatus 400. In some embodiments, the second apparatus includes a processor executing program code, for example, a microcontroller, a microprocessor, a CPU, a GPU, an auxiliary processing unit, a FPGA, or the like.

In one embodiment, the second apparatus includes a transceiver and a processor coupled to the transceiver. In one embodiment, the processor is configured to cause the apparatus to receive a request to create a new network slice instance according to an incorporation plan for deployment of a new version of network software and migrating one or more UE devices to the new network slice instance. In one embodiment, the processor is configured to cause the apparatus to create the new network slice instance according to the incorporation plan. In one embodiment, the processor is configured to cause the apparatus to assign the new network slice instance to a new S-NSSAI or assign the new network slice instance to an existing S-NSSAI.

A second method is disclosed for network slice installation-based deployment testing. The second method may be performed by a network node as described herein, for example, a gNB, a base unit 121, and/or the network equipment apparatus 400. In some embodiments, the second method may be performed by a processor executing program code, for example, a microcontroller, a microprocessor, a CPU, a GPU, an auxiliary processing unit, a FPGA, or the like.

In one embodiment, the second method receives a request to create a new network slice instance according to an incorporation plan for deployment of a new version of network software and migrating one or more UE devices to the new network slice instance. In one embodiment, the second method creates the new network slice instance according to the incorporation plan. In one embodiment, the second method assigns the new network slice instance to a new S-NSSAI or assign the new network slice instance to an existing S-NSSAI.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A network entity apparatus, comprising:
a transceiver; and
a processor coupled to the transceiver, the processor configured to cause the apparatus to:
    detect that a new version of network software is available;
    determine an incorporation plan for migrating to the new version of the network software;
    request a new network slice instance for deploying the new version of the network software according to the determined incorporation plan, wherein one or more user equipment ("UE") devices are assigned to the new network slice instance; and
    monitor performance of the one or more UE devices using the new version of the network software in the new network slice instance.

2. The apparatus of claim 1, wherein the new network slice instance is assigned to a new single network slice selection assistance information ("S-NSSAI") such that the new network slice instance is visible to the one or more UE devices, the subscription data of the one or more UE devices updated for the new network slice instance.

3. The apparatus of claim 1, wherein the new network slice instance is associated with an existing single network slice selection assistance information ("S-NSSAI") such that the new network slice is not visible to the one or more UE devices, the one or more UE devices assigned to the new network slice during a registration procedure.

4. The apparatus of claim 1, wherein the processor is configured to cause the apparatus to receive a notification in response to the new version of the network software being available for deployment.

5. The apparatus of claim 1, wherein the processor is configured to cause the apparatus to deploy the new version of the network software on a current network that the one or more UE devices are connected to according to the incorporation plan.

6. The apparatus of claim 1, wherein the incorporation plan comprises an identifier for the new network slice instance and one or more steps for implementing the incorporation plan, the one or more steps each comprising a replacement condition and a cancel condition.

7. The apparatus of claim 6, wherein a step of the one or more steps defines a group of UE devices of the one or more UE devices to migrate to the new network slice instance to use the new version of the network software.

8. The apparatus of claim 7, wherein the processor is configured to cause the apparatus to proceed to a next step of the incorporation plan in response to the monitored performance of the one or UE devices satisfying the replacement condition for a step of the incorporation plan.

9. The apparatus of claim 8, wherein the processor is configured to cause the apparatus to remove a current network slice instance that the one or more UE devices were previously connected to in response to each of the one or more UE devices being migrated to the new network slice instance.

10. The apparatus of claim 7, wherein the processor is configured to cause the apparatus to cancel deployment of the new software version in the new network slice instance in response to the monitored performance of the one or more UE devices not satisfying the replacement condition for a step of the incorporation plan.

11. The apparatus of claim 10, wherein cancelling deployment comprises modifying a number of UE devices that the new network slice instance can support until the monitored performance satisfies the replacement condition for the step of the incorporation plan.

12. The apparatus of claim 11, wherein the processor is configured to cause the apparatus to remove the new network slice instance in response to removing each UE device that is migrated to the new network slice instance back to a previous network slice instance.

13. The apparatus of claim 1, wherein the processor is configured to cause the apparatus to transmit a notification indicating one of success and failure of deployment of the new version of the network software in the new network slice instance.

14. A method of a network entity apparatus, comprising:
detecting that a new version of network software is available;
determining an incorporation plan for migrating to the new version of the network software;
requesting a new network slice instance for deploying the new version of the network software according to the determined incorporation plan, wherein one or more user equipment ("UE") devices are assigned to the new network slice instance; and
monitoring performance of the one or more UE devices using the new version of the network software in the new network slice instance.

15. A network entity apparatus, comprising:
a transceiver; and
a processor coupled to the transceiver, the processor configured to cause the apparatus to:
    receive a request to create a new network slice instance according to an incorporation plan for deployment of a new version of network software and migrating one or more user equipment ("UE") devices to the new network slice instance;
    create the new network slice instance according to the incorporation plan; and
    one of:
        assign the new network slice instance to a new single network slice selection assistance information ("S-NSSAI"); and
        assign the new network slice instance to an existing S-NSSAI.

* * * * *